United States Patent
Nguyen et al.

(10) Patent No.: US 7,410,180 B1
(45) Date of Patent: Aug. 12, 2008

(54) DOOR POSITIONING DEVICE

(76) Inventors: Trong D. Nguyen, 8425 Belvedere Ave., Suite 100, Sacramento, CA (US) 95826; Cliff L. Smith, 8425 Belvedere Ave., Suite 100, Sacramento, CA (US) 95826

(*) Notice: Subject to any disclaimer, the term of this patent is extended or adjusted under 35 U.S.C. 154(b) by 0 days.

(21) Appl. No.: 11/723,217

(22) Filed: Mar. 19, 2007

(51) Int. Cl.
*B60T 1/02* (2006.01)

(52) U.S. Cl. ............... 280/79.7; 280/47.27; 280/47.28; 280/47.29; 280/79.11; 280/47.11; 280/47.34; 280/62; 280/80.1; 280/87.01

(58) Field of Classification Search ............ 280/47.27, 280/47.28, 47.29, 79.7, 79.11, 32.6, 47.11, 280/47.34, 62, 80.1, 87.01
See application file for complete search history.

(56) References Cited

U.S. PATENT DOCUMENTS

| | | | | |
|---|---|---|---|---|
| 3,923,167 A | * | 12/1975 | Blankenbeckler | 414/11 |
| 4,270,741 A | | 6/1981 | Hurt | |
| 4,278,244 A | | 7/1981 | Carter | |
| 4,746,141 A | | 5/1988 | Willis | |
| 5,029,884 A | * | 7/1991 | Maendel | 280/47.27 |
| 5,035,445 A | * | 7/1991 | Poulin | 280/763.1 |
| 5,288,090 A | | 2/1994 | Bross | |
| 5,393,081 A | * | 2/1995 | Mortenson | 280/47.27 |
| 5,398,396 A | * | 3/1995 | Sanders et al. | 29/426.5 |
| 5,524,732 A | * | 6/1996 | Koke | 188/22 |
| 5,524,737 A | * | 6/1996 | Wang | 190/18 A |
| 5,799,959 A | * | 9/1998 | Krawczyk | 280/47.27 |
| 6,264,184 B1 | | 7/2001 | Armstrong et al. | |
| 6,341,788 B1 | * | 1/2002 | Ciccone | 280/47.28 |
| 6,739,819 B2 | * | 5/2004 | Caudill et al. | 414/11 |
| 6,857,836 B2 | * | 2/2005 | Keller | 414/11 |
| 6,866,274 B1 | * | 3/2005 | Muscat | 280/79.7 |

* cited by examiner

*Primary Examiner*—Christopher Ellis
*Assistant Examiner*—Cynthia F Collado
(74) *Attorney, Agent, or Firm*—Theodore J. Bielen, Jr.

(57) ABSTRACT

A door positioning device for use in a ground surface having an elongated platform with an upper surface and a lower surface. The platform also includes a first end portion and a second end portion. At least one wheel is located at the second end portion of the platform while a brake mechanism is located at the first end portion. A brake is provided with an actuator at the first end portion and a cable and cam mechanism for activating and deactivating the brake member contacting the wheel of the second end portion of the platform. As support is also employed for aiding in the securement of the door on the upper surface of the platform prior to and during movement of the door to a desired position.

10 Claims, 6 Drawing Sheets

DOOR POSITIONING DEVICE

BACKGROUND OF THE INVENTION

The present invention relates to a novel and useful door positioning device which may be employed to transport support, and place doors into door frames for mounting the same in a permanent manner.

In the past, doors being positioned for installation in an edifice had been transported manually by multiple persons who simply carried the door or move it on a hand truck or dolly. Although these prior art methods are successful in transporting the door to the vicinity of a door frame, the fitting of a door into a door frame or opening according to close tolerances requires shimming and supporting the door by more than one person. Of course, once the door is fitted to a door opening around all of its edges, the door jamb and hinges must be fitted by the use of a mechanical jig or vice.

In the past, several apparatuses have been proposed to transport doors. For example, U.S. Pat. No. 4,270,741 shows a door vice on a relatively short base which is moveable on wheels. Presumptively, multiple vices of the same construction may be used to move a door along a surface.

U.S. Pat. Nos. 4,746,141 and 5,288,090 describe wheeled dollies which include vertical and horizontal surfaces for contacting and supporting adjacent edges of a door during transportation.

U.S. Pat. Nos. 4,278,244 and 6,264,184 describe door carriers in which the door being transported is held in a vertical position in vice-like slots on a wheeled dolly. The adjustment of the position of the door may be altered manually or through gearing mechanism.

A door positioning device which is capable of transporting a door into position in a door frame with a high degree of control would be a notable advance in the building arts.

BRIEF SUMMARY OF THE INVENTION

In accordance with the present invention a novel and useful door positioning device is herein provided.

The device of the present invention utilizes an elongated platform having an upper surface, a lower surface, and first and second end portions. The lower surface is oriented adjacent to the ground surface upon which the door positioning device moves. The platform may include a smooth or padded upper surface so as not to mar the edge of the door being placed on the platform.

At least one wheel is located at the second end portion of the platform. In certain cases a pair of wheels are found in this position. Each wheel extends from the platform lower surface to allow movement of the platform relative to the ground surface.

A support is also found for aiding in the securement of the door on the upper surface of the platform. Such support may take the form of an arm or a plurality of arms that connect to the platform edge portion found between the upper and lower surfaces. The plurality of arms each extend or rotate upwardly and lock into position to contact the door found on the platform at a point above the upper surface of the platform. A line or strap may be employed or a pair of such supports are used to interlink such supports where either side of the door. In addition, the supports may be formed of soft material or be padded so as not to mar the sides of the door. In addition, the supports may be adjustable in length, telescopically, or by other means.

In addition, a guide system is used for aiding in the positioning of the door in the vicinity of the upper surface. Such guide system may take the form of elements which extend into the upper surface area of the platform from its edge portion. Each of the elements include a pivotal mount having a resilient positioning means. In this way the side of the door contacting such elements is guided into place on the upper surface of the platform with minimal probability of marring the door when performing this function.

Further, the device of the present invention includes a brake. The brake arrests movement of the wheels found at the second end portion of the platform. The brake includes a brake actuator located at the first end portion of the platform which is manipulated by the hand or foot of the operator employing device of the present invention. A brake member is also used for contacting the wheel or wheels of the second end portion of the platform. A cable or line interconnects the brake actuator with the brake member to achieve this result. The brake member is spring actuated or biased into contact with the wheel or wheels of the second end portion of the platform. A lock is also used to prevent the spring biasing the brake member into contact with the wheel. The brake actuator is capable of releasing such lock and allowing the spring to operate causing the brakes to stop the wheel or wheels of the second end portion of the platform as desired. Likewise, a brake control member would also lock the brake into a state of disengagement, thus and releasing the brake on the wheel at the second end portion of the platform and permitting the platform to easily roll or travel on the ground surface. The lock may include a rotatable cam having a cam surface with recesses as well as a cam follower capable of occupying the recess. The rotatable cam would be joined to the cable or line linked to the spring biasing the brake member into contact with the wheel on the platform.

The platform may also be formed with a distending lip extending from the area of the upper surface to a point below the lower surface thereof. The lip forms an open chamber with the platform lower surface which contains at least a portion of the brake mechanism described hereinabove. In this manner, the brake mechanism is protected against traumatic wear and tear.

It may be apparent that a novel and useful device for positioning a door has been described.

It is therefore an object of the present invention to provide a door positioning device which is capable of transporting a door for mounting the same in an opening of a door frame.

Another object of the present invention is to provide a door positioning device which supports a door for movement above a ground surface and also provides lateral support to the door without damaging the surface of the door.

Yet another object of the present invention is to provide a door positioning device which utilizes a platform moveable along a surface by one or more wheels and a braking mechanism which is actuated at one end of the platform to allow rotation of the platform relative to an immobilized wheel on the other end of the platform in order to raise the door into an upright position.

A further object of the present invention is to provide a door positioning device which is capable of transporting a door for mounting to the opening of a door frame which may be operated by a single person.

Another object of the present invention is to provide a door positioning system which includes a platform having a chamber which encloses and protects a brake mechanism for at least one wheel associated with the platform.

Another object of the present invention is to provide a door positioning device in which a brake mechanism is operated by either the hand or the foot of the operator.

A further object of the present invention is to provide a door positioning device which may be employed to mount pre-hung doors.

The invention possesses other objects and advantages especially as concerns particular characteristics and features thereof which will become apparent as the specification continues.

For a better understanding of the invention reference is made to the following detailed description of the preferred embodiments of the invention which should be taken in conjunction with the above described drawings.

DETAILED DESCRIPTION OF THE PREFERRED EMBODIMENTS OF THE INVENTION

Various aspects of the present invention will evolve from the following detailed description of the preferred embodiments thereof which should be referenced to the prior delineated drawings.

Figure 1:
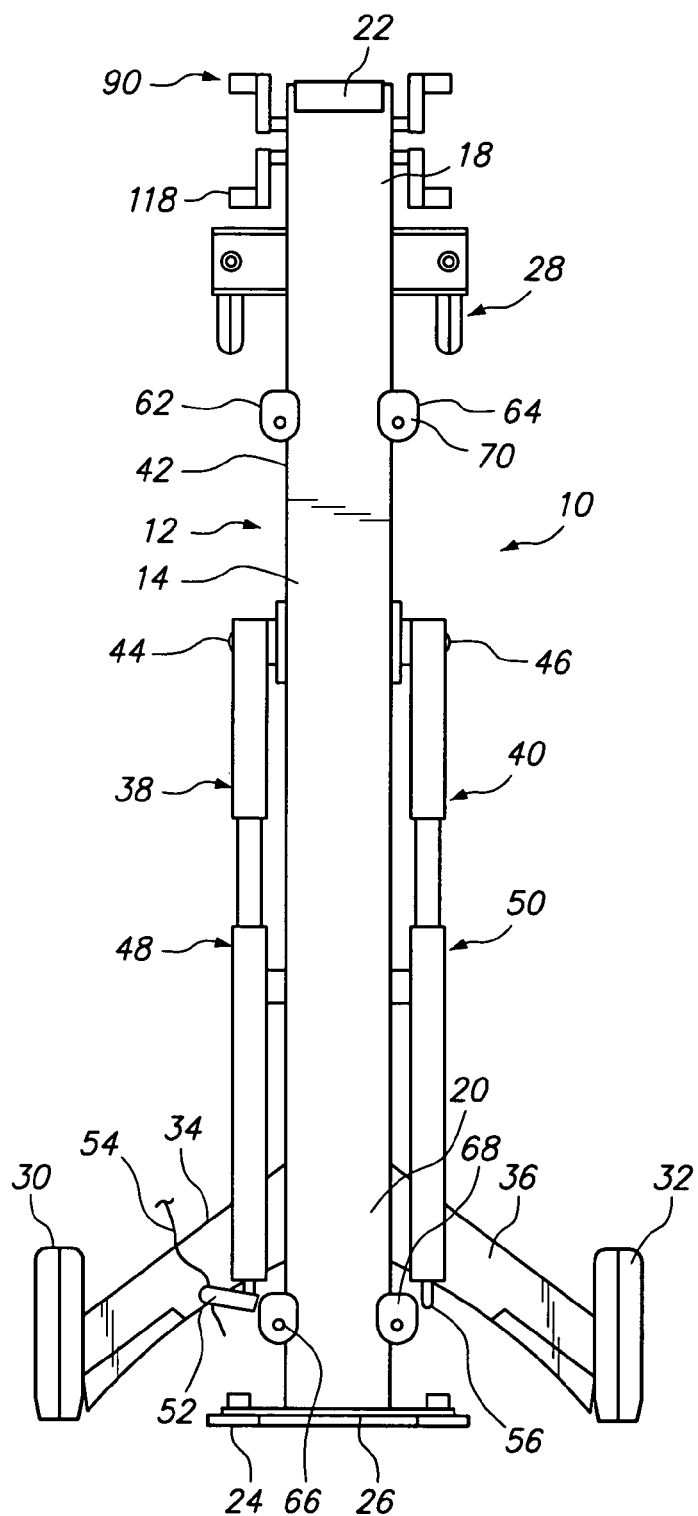
FIG. 1 is a top plan view of the door positioning device of the present invention.
Figure 2:
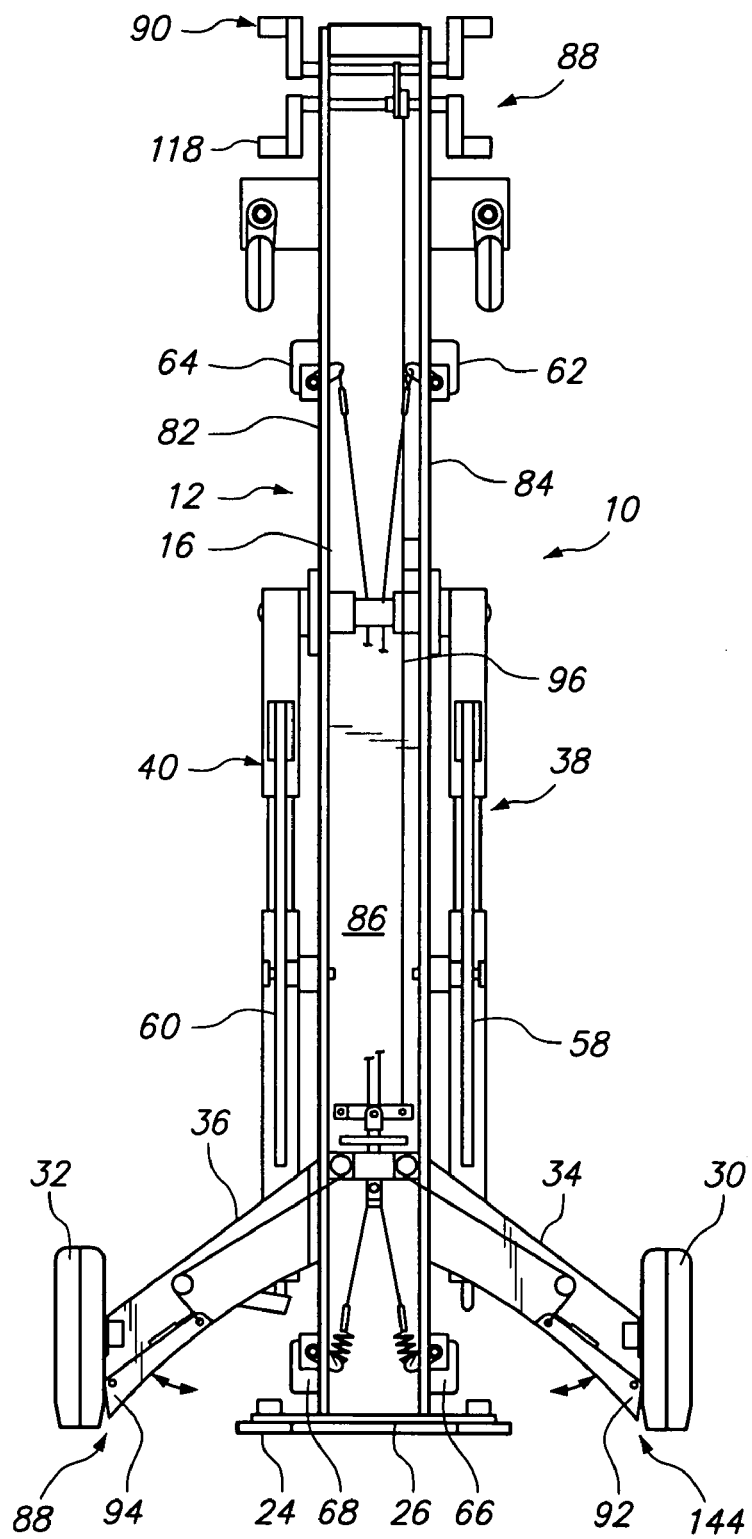
FIG. 2 is a bottom plan view of the device of the present invention.

An embodiment of the invention as a whole is depicted in the drawings by reference character 10. Door positioning device 10 includes as one of its elements a platform 12. Platform 12 possesses an upper surface 14 a lower surface 16, FIG. 2, first end portion 18, and second end portion 20. Upper surface 14 may be formed with a smooth finish or a softened material to prevent damage to a door which is intended to lie atop upper surface 14 of platform 12, as will be discussed hereinafter. A door contacting soft roller 22 is provided at first end portion 18 of platform 12. A removable barrier 24 is fastened to the second portion 20 of platform 12. That is to say, the removal of barrier 24 would allow a door to travel past the very end 26 of platform 12 should the operator or user of device 10 need to perform alteration work to a door, such as trimming, installing installation, and the like.

Device 10 further entails includes the provision of a pair of wheels, 28 at first end portion 18 thereof. A pair of wheels 28 may take the form of a pair of casters that freely pivot with the movement of platform 12. In addition, wheels 30 and 32 are employed with device 10 at second end portion 20 of platform 12. Wheels 30 and 32 are attached to arms 34 and 36, respectively. Arms 34 and 36 are, in turn, connected attached to platform 12. Needless to say, pair of wheels 28 and wheels 30 and 32 allow platform 12 to travel along surface 36, FIGS. 9 and 10 which will be discussed hereinafter.

Supports 38 and 40 attach to edge portion 42 of platform 12 via pivot pins 44 and 46 respectively. Supports 38, and 40 are shown in the form of telescoping rods 48 and 50, respectively. Rod 48 includes a buckle 52 at its end portion which carries a strap 54. Strap 54 links to ring 56 on the end of rod 50. As will be seen hereinafter, strap 54 is intended to travel over the top of a door being held on platform 12 and secured firmly in place by buckle 52 and ring 56. Supports 38 and 40 include sliding, slotted, braces 58 and 60 to maintain supports 38 and 40 in a vertical position when in use.

Figure 5:
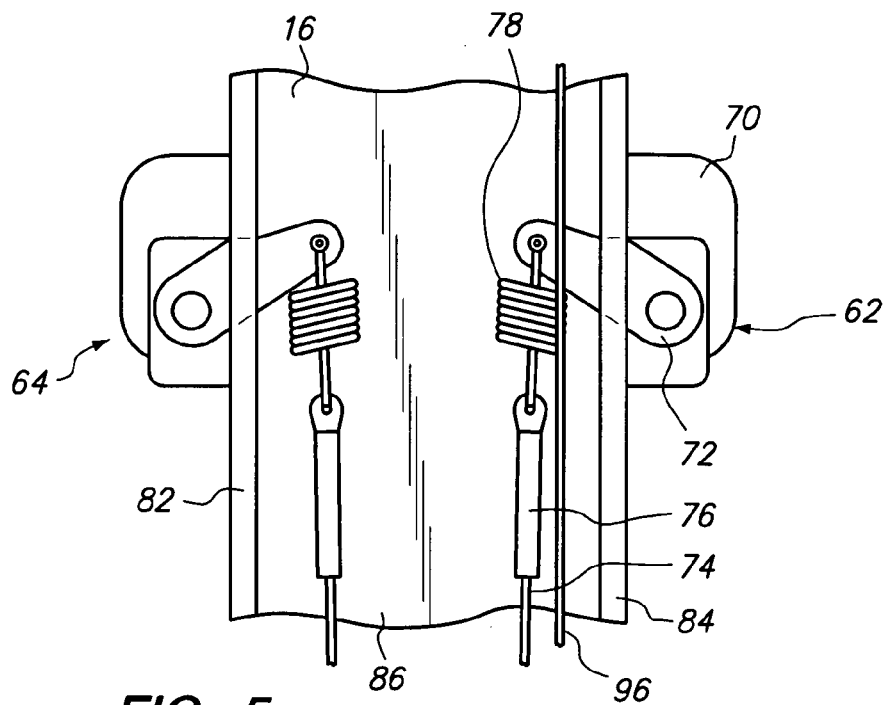
FIG. 5 is a top plan view of a portion of FIG. 2 depicting guide elements.

Spring loaded guides 60, 64, 66, and 68 are also included in the present invention and appear adjacent upper surface 14 of platform 12. With reference to FIG. 5, it may be observed that guides 62 and 64 are depicted in bottom plan view. With respect to exemplary guide 62, an element 70 extends slightly over the upper surface 14 of platform 12 and is pivotally connected to tab 72. Cable 74, fitting 76 and spring 78 linked to tab 72 provide a resilient positioning mechanism for element 70. That is to say, any pressure against element 70 on upper surface 14 of platform 12 will result in the retreat of element 70 followed by movement back into its original position once the force is removed. It should be noted that guide 60, 66, and 68 are similarly constructed.

Figure 6:
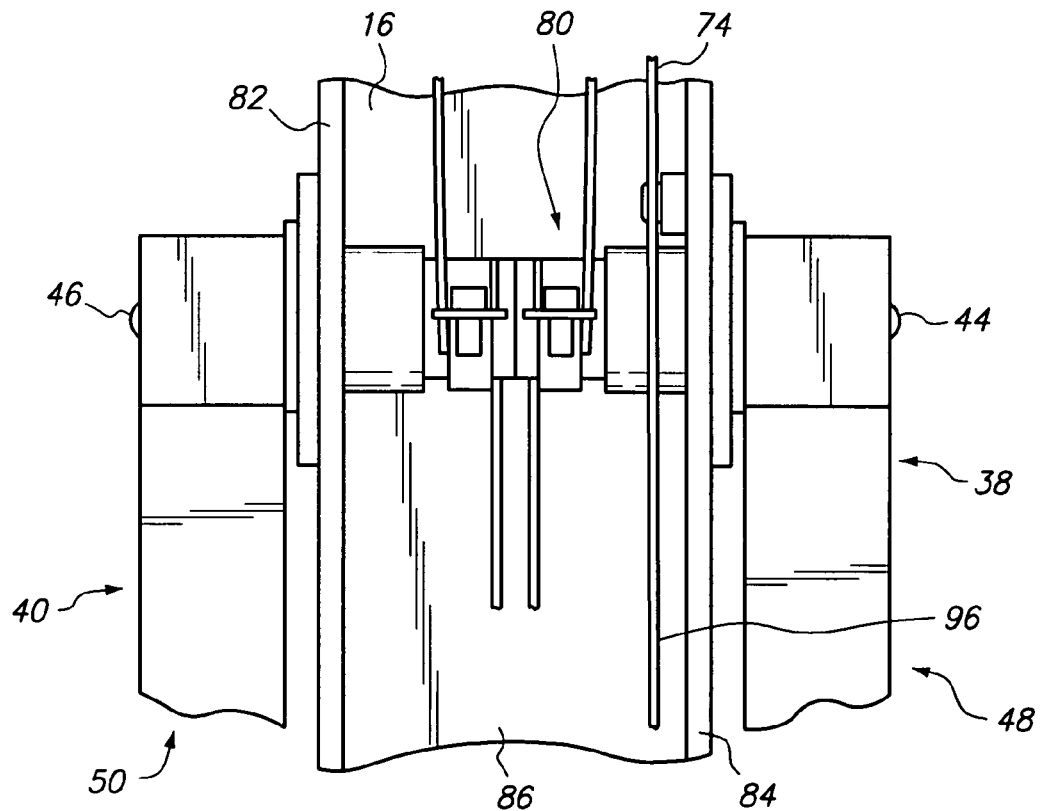
FIG. 6 is a top plan view of a portion of FIG. 2 showing the interconnection of a pair of supports to the platform and a portion of a spring mechanism for guides on the platform upper surface.

With reference to FIG. 6, it may be noted that cable 74 is fastened to clamp mechanism 80 which is located along the axis of pivot pins 44 and 46 of support 30 and 40, respectively. Moreover, lips 82 and 84 distend from platform 12 to form an open chamber 86 which tends to protect mechanisms adjacent lower surface 16 of platform 12. For example, the cable and spring system describe with respect to guide 62 of FIGS. 5 and 6 would fall in this category.

Figure 3:
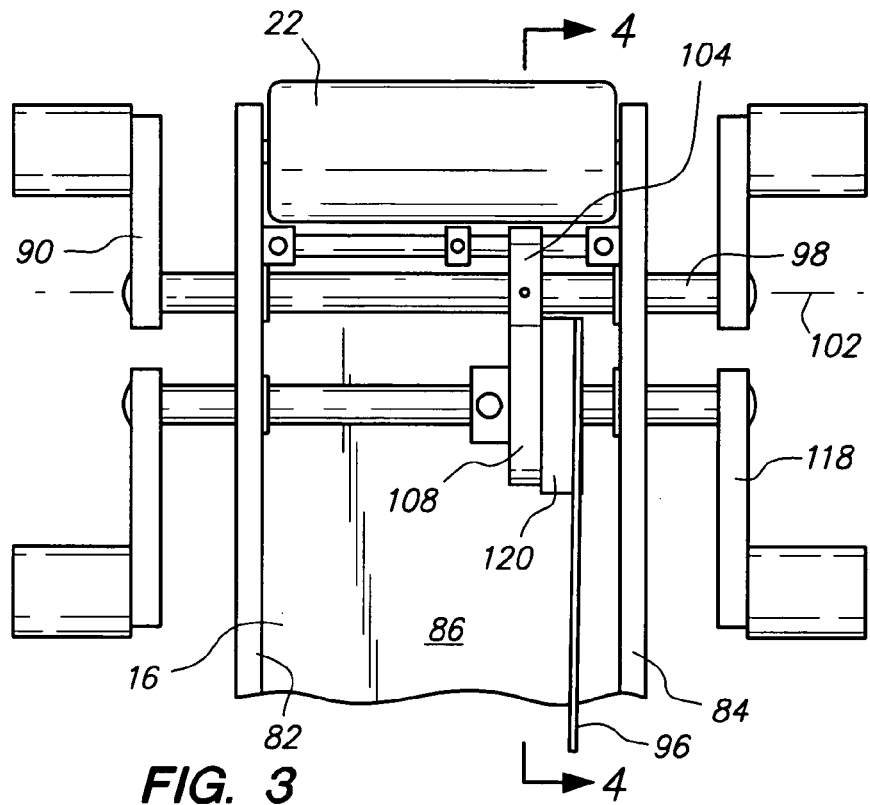
FIG. 3 is a top plan view of a portion of the brake mechanism actuated by the operator.
Figure 4:
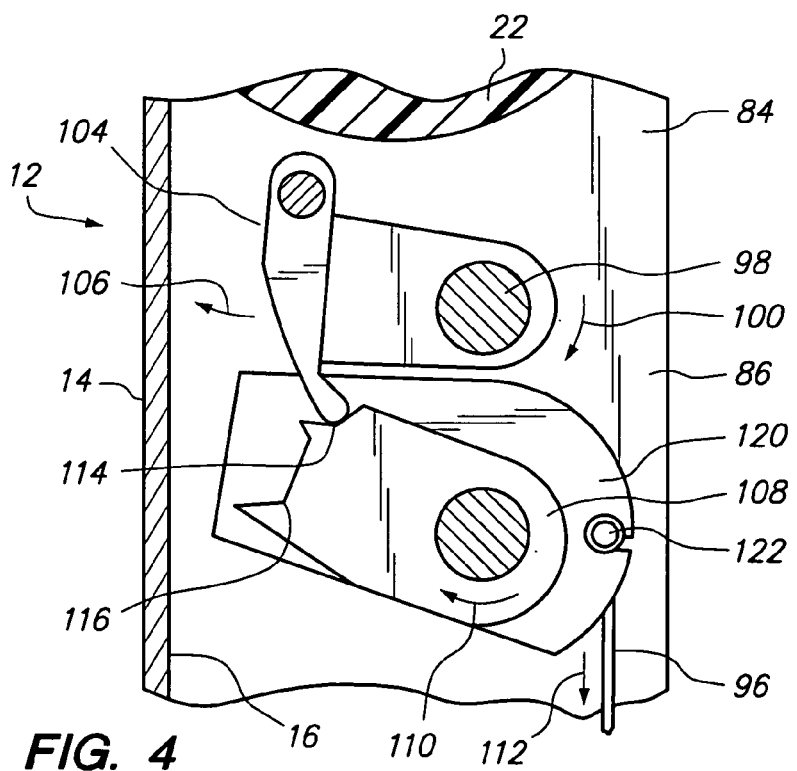
FIG. 4 is a sectional view taken along line 4-4 of FIG. 3.

With further reference to FIGS. 1-8, device 10 possesses a brake 88 is intended to arrest the movement of wheels 30 and 32. Brake 88 includes a brake actuator 90, FIGS. 1-3 in the form of an angulated rod or handle. Actuator 90 is linked to brake members 92 and 94 which pivotally engage wheels 30 and 32, respectively. Line or cable 96 achieves this result through a linkage hereinafter described. Turning to FIGS. 3 and 4, it may be observed that lever 90 includes a rotatable axle 98, movable according to directional arrow 100, FIG. 4. Actuator 90 rotates about axis 102, FIG. 3. Such movement, as shown in FIG. 4. Specifically when brake 88 is to be locked to wheels 30 and 32 cable 96 will rotate cam follower 104 according to directional arrow 106. Cam 108 will then rotate (directional arrow 110) under the tension of cable 96 directional arrow 112. At this point, cam follower 104 moves from recess 114 to recess 116. As will be hereinafter described, this movement locks brake members 92 and 94 to wheels 30 and 32, respectively. Control member 118, rotated opposite to directional arrow 110 of FIG. 4, will again move cam follower to recess 114 and unlock brake members 92 and 94. Holder 120 is fixed for rotation with cam 108 and includes a fitting 122 which secures cable 96.

Figure 7:
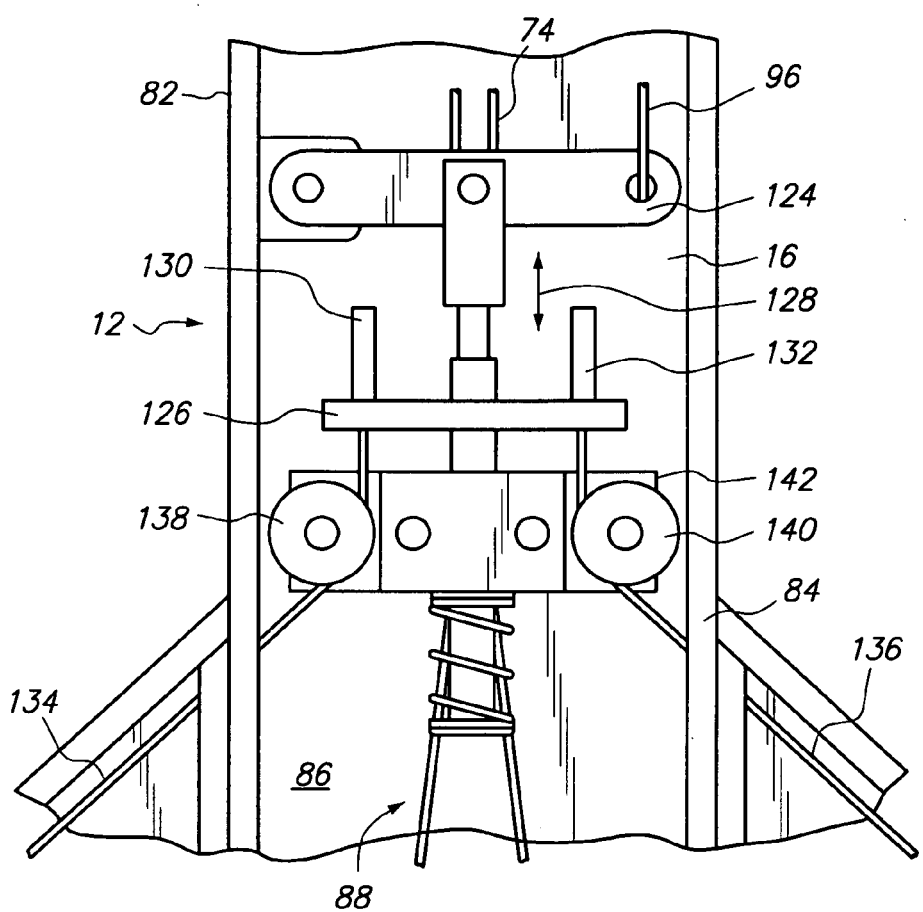
FIG. 7 is a top plan view of a portion of FIG. 2 in which the cable mechanism for the brake system is emphasized.

Referring now to FIG. 7, it may be observed that cable 96 extends along lower surface 16 of platform 12 within open chamber 86. Cable 96 attaches to pivoting arm 124 which moves a plate 126 upwardly or downwardly according to directional arrow 128. Fittings 130 and 132 fasten the ends of cables 134 and 136 which lead to the brakes of wheels 30 and 32, each constructed similarly to brake 88, which will be described hereinafter. Cables 134 and 136 pass over pulleys 38 and 140, respectively, mounted to a base member 142 found atop lower surface 16 within chamber 86. In essence, the single pull of cable 96 is translated into the double pull of cables 134 and 136 through this mechanism found in FIG. 7.

Figure 8:
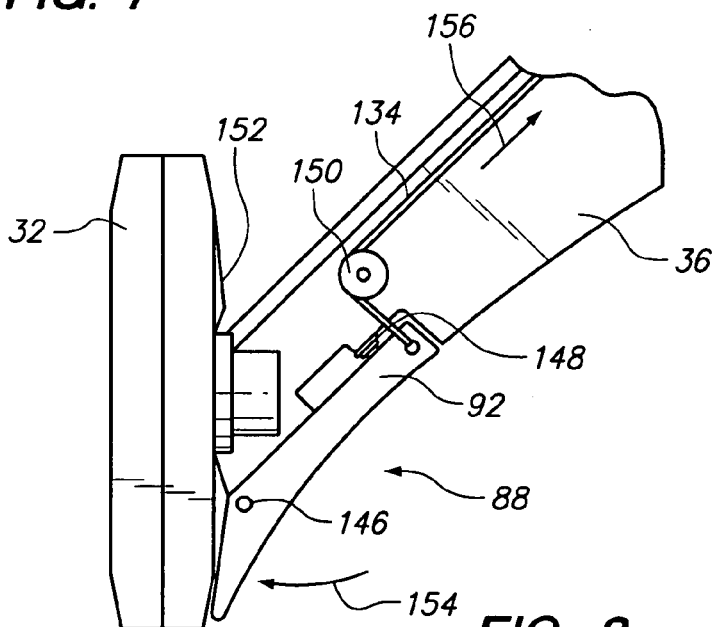
FIG. 8 is a top plan view of a wheel and brake member in its stop mode.

With reference to FIG. 8, it may be shown that brake 88, with respect to wheel 32, is shown. It should be understood that the brake 144 found in conjunction with wheel 30 is similarly constructed. In this regard, brake 88 having brake member 92 pivots around axial member 146 and is biased into the position shown in FIG. 8, brake engaged, by the action of spring 148 mounted between brake member 92 and arm 36. Cable 134 attaches to brake member 92 via pulley 150. Thus, brake member 92 frictionally engages brake pad 152 of wheel 132 by the action of spring 148 and the release of cable 134 by brake actuator 90, FIG. 1, heretofore described. Directional arrow 154 indicates such motion. Directional arrow 156 indicates the movement of cable 134 to release brake 88 on wheel 32. Such release takes place by the rotation of control member 118.

Figure 9:
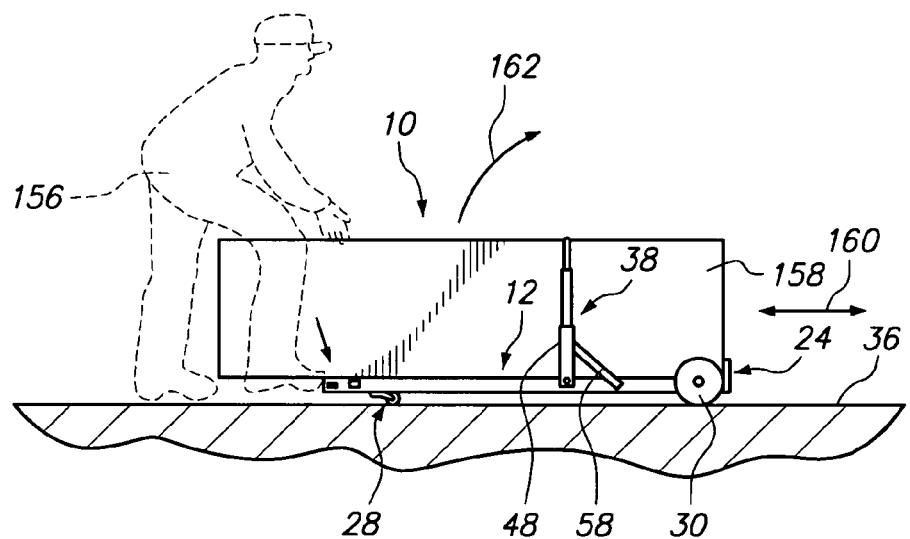
FIG. 9 is a schematic view depicting the movement of a door along a surface by an operator.
Figure 10:
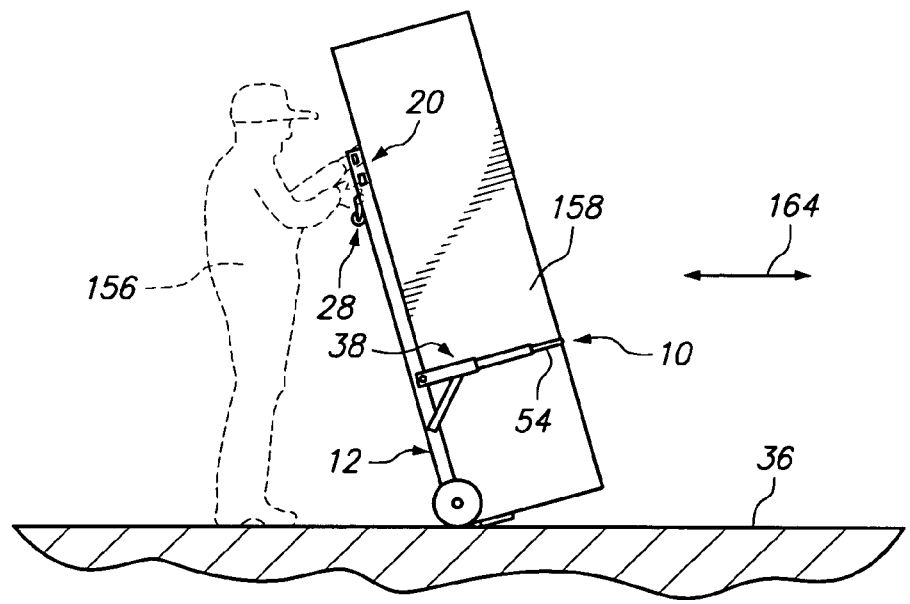
FIG. 10 is a schematic view showing the operation of the device of the present invention in where the brake mechanism has been actuated and the operator has tilted a door to an upright position.

In operation, with reference to FIGS. 9 and 10, a user 156 slides a door 158 onto platform 12 of device 10, specifically smooth upper surface 14 thereof. Brake 88 may be engaged at this time by the use of actuator 90 that is manipulated by the hand or foot of the user 156. Supports 38 and 40 are extended at this time as depicted in FIGS. 9 and 10 such that strap 54 may be extended over the edge of door 158 and secured tightly by the use of buckle 52 and ring 56, FIG. 1. Barrier 24, and guide 62, 64, 66, and 68 aid in the positioning of door 158 on platform 12 at this time. Wheels 30 and 32, as well as pair of wheels 28, allow door 158 to be moved along surface 36 according to directional arrow 160, FIG. 9. When door is moved into the vicinity of the opening of the door frame (not shown), door 158 may be rotated upwardly according to directional arrow 162, FIG. 9. At this point, brake 88 would be actuated by the hand or foot of the user by the use of actuator 90, which essentially allows the spring bias of brakes 88 and 144 to operate simultaneously. At this point, door 158 is easily moved into the upright position shown in FIG. 10 since wheels 30 and 32 are immobilized. Door 158 will remain or stand in this position solely through the operation of device 10. Door 158 can then be maneuvered into place or further moved according to directional arrow 64, FIG. 10 after releasing brake 88 via control member 118. Again, door 158 may be further maneuvered by applying the force to platform 12 with the coordination of the release and setting of brake 88 as heretofore described. It should be noted that device 10 may also be employed to transport and position other objects similar in configuration to door 158 such as panels, sheeting, lumber, and the like.

While in the foregoing, embodiments of the present invention have been set forth in considerable detail for the purposes of making a complete disclosure of the invention, it may be apparent to those of skill in the art that numerous changes may be made in such detail without departing from the spirit and principles of the invention.

What is claimed is:

1. A door positioning device for use on a ground surface comprising:
    a. an elongated platform, said platform having an upper surface and a lower surface relative to the ground surface said elongated platform further comprising a first end portion and a second end portion;
    b. at least one wheel located at said second end portion of said platform, said one wheel extending from said platform for movement relative to the ground surface;
    c. a support for aiding in the securement of the door on said upper surface of said platform, said support including a pivot for rotating said support upwardly relative to said platform;
    d. a brake, said brake arresting movement of said wheel and said platform relative to the ground surface, said brake including a brake actuator located at said first end portion of said platform actuator and a brake member for contacting said one wheel; and
    e. a spring, said spring biasing said brake member into contact with said one wheel upon operation of said brake actuator.

2. The device of claim 1 in which said brake actuator further includes a line linked to said spring biasing said brake member into contact with said one wheel.

3. The device of claim 2 in which said brake actuator further includes a lock for preventing said spring biasing said brake member into contact with said one wheel.

4. The device of claim 3 in which said lock include a rotatable cam having a cam surface with a recess and a cam follower capable of occupying said recess, said rotatable cam being joined to said cable linked to said spring biasing said brake member into contact with said one wheel.

5. The device of claim 1 in which said platform further comprises a lip distending relative to said upper surface to a position below said lower surface to form an open chamber said open chamber containing at least a portion of said brake therewithin.

6. A door positioning device for use on a ground surface comprising:
    a. an elongated platform, said platform having an upper surface and a lower surface relative to the ground surface, said elongated platform further comprising a first end portion and a second end portion;
    b. at least one wheel located at said second end portion of said platform, said one wheel extending from said platform for movement relative to the ground surface;
    c. a support for aiding in the securement of the door on said upper surface of said platform, said support comprising a pair of elongated rods, each pivotally attached to said platform;
    d. a brake, said brake arresting movement of said wheel and said platform relative to the ground surface, said brake including a brake actuator located at said first end portion of said platform actuator and a brake member for contacting said one wheel; and
    e. a spring, said spring biasing said brake member into contact with said one wheel upon operation of said brake actuator.

7. The device of claim 6 in which said platform further includes an edge portion between said upper and lower surfaces and said pair of elongated rods are each pivotally attached to said edge portion of said platform.

8. A door positioning device for use on a ground surface comprising:
    a. an elongated platform, said platform having an upper surface and a lower surface relative to the ground surface said elongated platform further comprising a first end portion and a second end portion;
    b. at least one wheel located at said second end portion of said platform, said one wheel extending from said platform for movement relative to the ground surface;
    c. a support for aiding in the securement of the door on said upper surface of said platform;
    d. a brake, said brake arresting movement of said wheel and said platform relative to the ground surface, said brake including a brake actuator located at said first end portion of said platform actuator and brake member for contacting said one wheel;

e. a spring, said spring biasing said brake member into contact with said one wheel upon operation of said brake actuator; and f. a guide for aiding in the positioning of the door at said upper surface of said platform, said guide comprising a plurality of elements positioned along said upper surface of said platform, each of said elements including a pivotal mount having a resilient positioning mechanism.

9. A door positioning device for use on a ground surface comprising:

a. an elongated platform, said platform having an upper surface and a lower surface relative to the ground surface said elongated platform further comprising a first end portion and a second end portion;

b. at least one wheel located at said second end portion of said platform, said one wheel extending from said platform for movement relative to the ground surface;

c. a support for aiding in the securement of the door on said upper surface of said platform;

d. a brake, said brake arresting movement of said wheel and said platform relative to the ground surface, said brake including brake actuator located at said first end portion of said platform actuator and a brake member for contacting said one wheel;

e. a spring, said spring biasing said brake member into contact with said one wheel upon operation of said brake actuator; and f. a stop on said upper surface of said platform, said stop intended to contact the door on said upper surface of said platform to prevent sliding movement of said door relative to said upper surface of said platform.

10. The device of claim 9 in which said stop further comprises means for removably mounting said stop to said platform.

* * * * *